United States Patent
Maeda et al.

(10) Patent No.: US 7,938,718 B2
(45) Date of Patent: May 10, 2011

(54) GAME PROGRAM, GAME DEVICE, AND GAME METHOD

(75) Inventors: Koji Maeda, Osaka (JP); Hideki Nagahama, Hyogo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 277 days.

(21) Appl. No.: 12/103,846

(22) Filed: Apr. 16, 2008

(65) Prior Publication Data

US 2008/0200223 A1 Aug. 21, 2008

Related U.S. Application Data

(63) Continuation of application No. PCT/JP2006/316225, filed on Aug. 18, 2006.

(30) Foreign Application Priority Data

Dec. 13, 2005 (JP) ................................ 2005-358675

(51) Int. Cl.
- *A63F 9/24* (2006.01)
- *A63F 13/00* (2006.01)
- *G06F 17/00* (2006.01)
- *G06F 19/00* (2006.01)

(52) U.S. Cl. ............. 463/3; 463/1; 463/2; 463/4; 463/5; 463/6; 463/7; 463/8; 463/30; 463/31; 463/32; 463/36; 463/37; 463/38; 463/39; 463/40; 463/41; 463/42; 463/43; 463/44

(58) Field of Classification Search .................. 463/1–8, 463/30–32, 36–39, 40–44
See application file for complete search history.

(56) References Cited

U.S. PATENT DOCUMENTS

| | | | |
|---|---|---|---|
| 6,368,210 B1 | 4/2002 | Toyohara et al. | |
| 6,746,331 B1* | 6/2004 | Saikawa et al. | ................. 463/31 |
| 6,855,057 B2 | 2/2005 | Namba et al. | |
| 6,884,163 B2 | 4/2005 | Namba et al. | |
| 2002/0103016 A1 | 8/2002 | Namba et al. | |

FOREIGN PATENT DOCUMENTS

| | | |
|---|---|---|
| DE | 602 00 620 T2 | 6/2005 |
| EP | 1 010 446 A1 | 6/2000 |
| EP | 1 228 793 A2 | 8/2002 |
| JP | 2000-176171 A | 6/2000 |
| JP | 2002-224441 A | 8/2002 |
| JP | 2006-181244 A | 7/2006 |
| TW | I222890 B | 11/2004 |
| TW | I233827 B | 6/2005 |

* cited by examiner

*Primary Examiner* — Melba Bumgarner
*Assistant Examiner* — Jason Pinheiro
(74) *Attorney, Agent, or Firm* — Global IP Counselors, LLP

(57) ABSTRACT

A control unit mainly includes game condition judging means, moving period determining means for determining a moving period T0 of a ball object, first operation response period determining means for determining a first operation response period T1 of a bat object, which begins at a first operation response start opportunity St1 preceding a pitching end opportunity E0 of the moving period T0, second operation response period determining means for determining a second operation response period T2 of the bat object, which begins at a second operation response start opportunity St2 succeeding the first operation response start opportunity St1, operation input opportunity receiving means for receiving a operation input opportunity HP of a controller, and operation opportunity response judging means for judging whether the operation input opportunity HP is included in either the first operation response period T1 or the second operation response period T2.

2 Claims, 9 Drawing Sheets

GAME PROGRAM, GAME DEVICE, AND GAME METHOD

CROSS-REFERENCE TO THE RELATED APPLICATIONS

This application claims priority to Japanese Patent Application No. 2005-358675 and International Patent Application No. PCT/JP2006/316225. The entire disclosure of Japanese Patent Application No. 2005-358675 and International Patent Application No. PCT/JP2006/316225 is hereby incorporated herein by reference.

BACKGROUND ART

Field of the Invention

The preset invention relates to a game program, particularly to a game program for realizing a game in which a game character is caused to perform an action with a computer. Furthermore, the present invention relates to a game device and a game method, which are realized by the game program.

Various games have been proposed in the past. As one of such games, a competitive video game, such as a baseball video game, has been known that a player character displayed in a monitor is caused to perform an action for playing a competitive game. In this type of baseball game, a game player is allowed to select a baseball team from a variety of baseball teams to which each of baseball player characters belongs, and is allowed to play a game with other game players who selected other baseball team, or a computer. JIKKYOU PAWAFURU PURO YAKYU 1, Official Guide Complete Edition, Japan, Konami Media Entertainment, Sep. 16, 2004, discloses such game as an example.

In this type of baseball game, for instance, a bat object of a batter character is operated by the manipulation of an input button by a game player and a pitcher character is operated by the manipulation by an opponent game player, and thus a game that a ball object released from the pitcher character is hit by the bat object is performed. Here, it is possible to cause the bat object of the batter character, which is displayed on a monitor, to perform an action by the manipulation of the input button by the game player.

In this type of baseball game, first, when a game player presses any of up, down, left, and right buttons that make up of an arrow button, a contact hitting cursor that is an indicator for capturing a ball object is moved in the corresponding direction of the up, down, left, and right directions. Next, if an X button is pressed for hitting the ball object by the bat object when the ball object released from the pitcher character reaches a passing position of a hitting surface, the batter character starts swinging the bat. Accordingly, the bat object displayed on the monitor starts moving at a constant speed. Then, if the timing that the released ball object reaches the hitting surface and the timing that the bat object reaches the hitting surface are matched within a predetermined time period, the released ball object is configured to be hit by the bat object.

This type of contact hitting cursor includes two modes. One is a loose swing mode (so called, a normal mode, a contact hitting mode) in which the contact hitting cursor is formed in a horizontally long and substantially raindrop shape and the area for capturing the ball object is formed to be large. The other is a powerful swing mode in which the contact hitting cursor is formed in a circular shape to be smaller than the contact hitting cursor on the loose swing mode and the area for capturing the ball object is formed to be small. It is possible to switch between the loose swing mode and the powerful swing mode when the game player presses an R1 button or an R2 button. The loose swing mode has a feature that the ball object is easily captured because the area of the contact hitting cursor is large but the flying distance of the batted ball is short. In addition, the powerful swing mode has a feature that the ball object is not easily captured because the area of the contact hitting cursor is small but the flying distance of the batted ball is long. In this case, a game player preliminarily selects either the loose swing mode or the powerful swing mode before the pitcher character releases the ball object, and the ball object is to be hit when the game player focuses the contact hitting cursor on a terminal point of the ball object by moving the contact hitting cursor on the selected mode in the up, down, left, and right directions and presses the X button.

SUMMARY OF THE INVENTION

In the conventional baseball game in which it is allowed to switch between the loose swing mode and the powerful swing mode, the ball object is configured to be easily captured on the loose swing mode but is configured not to be easily captured on the powerful swing mode by changing the area of the contact hitting cursor. In addition, on the both of the loose swing mode and the powerful swing mode, the ball object is configured to be hit when the timing that the X button is pressed while the contact hitting cursor is focused on the terminal point of the ball object, and the timing that the ball object reaches the hitting surface, are matched within a predetermined time period.

However, in the real-world baseball, the swing speed of a bat when a bat is powerfully swung is generally faster than the swing speed of a bat when a bat is loosely swung. Accordingly, the timing that the bat hits the ball when the bat is powerfully swung is perceived to be faster than the timing that the bat hits the ball when the bat is loosely swung. On the other hand, in the conventional baseball game, the timings of manipulating a controller when the bat object is caused to be swung on the both of the powerful swing mode and the loose swing mode, in other words, the timings of pressing the X button on the both of the powerful swing mode and the loose swing mode, are configured to be the same. Because of this, a game player cannot feel that the timing of pressing the X button on the powerful swing mode is faster than the timing of pressing the X button on the loose swing mode, although this situation is seen in the real-world baseball. Therefore, it is very difficult to realize a baseball game with reality that is more like the real-world baseball.

An object of the present invention is to realize a game with reality with a game program.

A first aspect of the present invention is a game program for realizing the following functions in a computer that is allowed to realize a game in which a moving object is caused to move from a first position to a second position and an object is caused to make contact with the moving object moved to the second position by an input operation of an operating unit:

(1) A game condition judging function for judging whether either a predetermined first game condition of the object or a predetermined second game condition of the object is satisfied.

(2) A moving period determining function for determining a moving period in which the moving object moves from the first position to the second position before the moving object starts moving.

(3) A first manipulation response period determining function for determining a predetermined first manipulation response period of the object, which begins at a start opportunity preceding an end opportunity of a moving period of the moving object that is determined by the moving period determining function, when the predetermined first game condition is judged to be satisfied by the game condition judging function.

(4) A second manipulation response period determining function for determining a predetermined second manipulation response period of the object, which begins at a start opportunity succeeding the start opportunity of the predetermined first manipulation response period of the object that is determined by the first manipulation response period determining function, when the predetermined second game condition is judged to be satisfied by the game condition judging function.

(5) A manipulation input opportunity receiving function for receiving a manipulation input opportunity at which an input signal by a predetermined input operation of the operating unit is received after the moving object starts moving.

(6) A manipulation opportunity response judging function for judging whether the manipulation input opportunity of the operating unit received by the manipulation input opportunity receiving function is included in either the first manipulation response period determined by the first manipulation response period determining function or the second manipulation response period determined by the second manipulation response period determining function.

In the game realized by this program, it is judged whether either the predetermined first game condition of the object or the predetermined second game condition of the object is satisfied in the game condition judging function. In the moving period determining function, the moving period in which the moving object moves from the first position to the second position is determined before the moving object starts moving. In the first manipulation response period determining function, when the predetermined first game condition is judged to be satisfied by the game condition judging function, the predetermined first manipulation response period of the object is determined, which begins at the start opportunity preceding the end opportunity of the moving period of the moving object that is determined by the moving period determining function. In the second manipulation response period determining function, when the predetermined second game condition is judged to be satisfied by the game condition judging function, the predetermined second manipulation response period of the object is determined, which begins at the start opportunity succeeding the start opportunity of the predetermined first manipulation response period of the object that is determined by the first manipulation response period determining function. In the manipulation input opportunity receiving function, after the moving object starts moving, the manipulation input opportunity at which an input signal by the predetermined input operation of the operating unit is received. In the manipulation opportunity response judging function, it is judged whether the manipulation input opportunity of the operating unit received by the manipulation input opportunity receiving function is included in either the first manipulation response period determined by the first manipulation response period determining function or the second manipulation response period determined by the second manipulation response period determining function.

For example, the following case is considered: a baseball game in which a player character is caused to perform an action is realized. Here, in the baseball game, the following game is performed: a pitcher character pitches a ball object from a pitching position (surface from which the ball object is released) of the pitcher character to a batting position (hitting surface that the ball object reaches) of a batter character, and a bat object (contact hitting cursor) is caused to make contact with the ball object that reaches the batting position (hitting surface) of the batter character by the manipulation of an operating unit by a game player. Here, the ball object is the moving object, and the object is the bat object (contact hitting cursor). In addition, the pitching position (surface from which the ball object is released) of the pitcher character, from which the pitcher character releases the ball object, is a first position, and the batting position (hitting surface that the ball object reaches) is a second position.

First, it is judged whether either the predetermined first game condition of the object or the predetermined second game condition of the object is satisfied by the game condition judging function. Here, the predetermined first game condition of the object is a condition of a bat object (contact hitting cursor). For example, the condition is a powerful swing mode with a feature that the area of the contact hitting cursor is small and the flying distance of a batted ball is long. In addition, the predetermined second game condition of the object is a condition of the bat object (contact hitting cursor). For example, the condition is a loose swing mode with a feature that the area of the contact hitting cursor is large and the flying distance of a batted ball is short. In the game condition judging function, it is judged whether which mode is selected among the predetermined first game condition of the object, that is, the powerful swing mode, and the predetermined second game condition of the object, that is, the loose swing mode.

Next, the moving period that the moving object moves from the first position to the second position is determined by the moving period determining function before the moving object starts moving. Specifically, the moving period is determined, which is the time elapsed while the ball object moves from the pitching position (surface from which the ball object is released) of the pitcher character to the batting position (hitting surface that the ball object reaches) of the batter character. Here, the moving period is the time elapsed from a pitching start opportunity at which the ball object is released to a pitching end opportunity at which the ball object reaches the hitting surface. Note the term "opportunity" herein means instant such as time of a day and timing, and is used distinctly from the term "period" that means the time elapsed from a start opportunity to an end opportunity.

If the moving period of the ball object is determined by the moving period determining function, the predetermined first manipulation response period of the object, which begins at the start opportunity preceding the end opportunity of the moving period of the moving object that is determined by the moving period determining function, is determined by the first manipulation response period determining function when the predetermined first game condition is judged to be satisfied by the game condition judging function. Specifically, when the powerful swing mode is judged to be currently selected by the game condition judging function, the predetermined first manipulation response period of the bat object (contact hitting cursor) is determined, which begins at the start opportunity preceding the end opportunity of the moving period of the ball object. Here, the predetermined first manipulation response period of the bat object (contact hitting cursor) is a manipulation response time of the operating unit during which the ball object is allowed to be hit on the powerful swing mode.

In addition, if the moving period of the ball object is determined by the moving period determining function, the predetermined second manipulation response period of the object, which begins at the start opportunity succeeding the start opportunity of the predetermined first manipulation response period of the object that is determined by the first manipulation response period determining function, is determined by the second manipulation response period determining function, when the predetermined second game condition is judged to be satisfied by the game condition judging function. Specifically, when the loose swing mode is judged to be currently selected by the game condition judging function, the predetermined second manipulation response period of the bat object (contact hitting cursor) is determined, which begins at the start opportunity succeeding the start opportunity of the predetermined first manipulation response period of the bat object (contact hitting cursor). Here, the predetermined second manipulation response period of the bat object (contact hitting cursor) is a manipulation response time of the operating unit during which the ball object is allowed to be hit on the loose swing mode. Here, the start opportunity of the predetermined first manipulation response period of the bat object (contact hitting cursor) on the powerful swing mode is configured to precede the start opportunity of the predetermined second manipulation response period of the bat object (contact hitting cursor) on the loose swing mode.

Next, after the moving object starts moving, the manipulation input opportunity, at which the input signal by the predetermined input operation of the operating unit is received, is received by the manipulation input opportunity receiving function. Specifically, after the ball object is released by the pitcher character, the manipulation input opportunity at which the operating unit is manipulated for causing the bat object to swing, for instance, the manipulation input opportunity at which an X button of a controller is pressed, is received. Here, the manipulation input opportunity means instant at which the input operation is performed, such as the time of a day and the timing at which the operating unit is manipulated.

When the manipulation input opportunity of the operating unit is received by the manipulation input opportunity receiving function, it is judged by the manipulation opportunity response judging function whether the manipulation input opportunity of the operating unit, which is received by the manipulation input opportunity receiving function, is included in either the first manipulation response period determined by the first manipulation response period determining function or the second manipulation response period determined by the second manipulation response period determining function. Specifically, when the powerful swing mode is currently selected, it is judged whether the manipulation input opportunity of the operating unit is included in the predetermined first manipulation response period of the bat object (contact hitting cursor) on the powerful swing mode. In addition, when the loose swing mode is currently selected, it is judged whether the manipulation input opportunity of the operating unit is included in the predetermined second manipulation response period of the bat object (contact hitting cursor) on the loose swing mode.

In this game program, the predetermined first manipulation response period of the object, which begins at the start opportunity preceding the end opportunity of the moving period of the moving object that is determined by the moving period determining function, is determined by the first manipulation response period determining function, when the predetermined first game condition is judged to be satisfied by the game condition judging function. In addition, the predetermined second manipulation response period of the object, which begins at the start opportunity succeeding the start opportunity of the predetermined first manipulation response period of the object that is determined by the first manipulation response period determining function, is determined by the second manipulation response period determining function, when the predetermined second game condition is judged to be satisfied by the game condition judging function. Specifically, when the powerful swing mode is judged to be currently selected by the game condition judging function, the predetermined first manipulation response period of the bat object (contact hitting cursor) is determined, which begins at the start opportunity preceding the end opportunity of the moving period of the ball object. In addition, when the loose swing mode is judged to be currently selected by the game condition judging function, the predetermined second manipulation response period of the bat object (contact hitting cursor) is determined, which begins at the start opportunity succeeding the start opportunity of the predetermined first manipulation response period of the bat object (contact hitting cursor). Here, the start opportunity of the predetermined first manipulation response period of the bat object (contact hitting cursor) on the powerful swing mode is set to precede the start opportunity of the predetermined second manipulation response period of the bat object (contact hitting cursor) on the loose swing mode. Accordingly, it is possible to set the timing of manipulating the operating unit on the powerful swing mode to be faster than the timing of manipulating the operating unit on the loose swing mode. Because of this, in this game program, it is possible to realize a situation that the timing of hitting a ball with a bat when the bat is powerfully swung is perceived to be faster than the timing of hitting a ball with a bat when the bat is loosely swung. Accordingly, it is possible to realize a baseball game with reality that is more like the real-world baseball.

A second aspect of the present invention is the game program of the first aspect for further realizing the following functions in the computer.

(7) A moving object contact judging function for judging that the object makes contact with the moving object when the received manipulation input opportunity of the operating unit is judged to be included in either the first manipulation response period or the second manipulation response period by the manipulation opportunity response judging function.

(8) A moving object non-contact judging function for judging that the object does not make contact with the moving object when the received manipulation input opportunity of the operating unit is judged not to be included in either the first manipulation response period or the second manipulation response period by the manipulation opportunity response judging function.

In the game realized by this program, furthermore, the object is judged to make contact with the moving object when the manipulation input opportunity of the operating unit is judged to be included in either the first manipulation response period or the second manipulation response period by the moving object contact judging function. Furthermore, the object is judged not to make contact with the moving object when the manipulation input opportunity of the operating unit is judged not to be included in either the first manipulation response period or the second manipulation response period by the moving object non-contact judging function. Specifically, when either the powerful swing mode or the loose swing mode is currently selected and the manipulation input opportunity of the operating unit is included in either the predetermined first manipulation response period of the bat object (contact hitting cursor) on the powerful swing mode or the predetermined second manipulation response period of the bat object (contact hitting cursor) on the loose swing mode, the ball object is judged to be allowed to be hit, in other words, the ball object is judged to be cleanly hit, by the moving object contact judging function. In addition, when either the powerful swing mode or the loose swing mode is currently selected and the manipulation input opportunity of the operating unit is not included in either the predetermined first manipulation response period of the bat object (contact hitting cursor) on the powerful swing mode or the predetermined second manipulation response period of the bat object (contact hitting cursor) on the loose swing mode, the ball object is judged not to be allowed to be hit, in other words, the ball object is judged to be mishit, by the moving object non-contact judging function.

Here, it is judged by the moving object contact judging function whether the ball object is cleanly hit, and it is judged by the moving object non-contact judging function whether the ball object is not allowed to be hit, that is, the ball object is mishit. Accordingly, it is possible to realize a baseball game with reality that is more like the real-world baseball.

A third aspect of the present invention is the game program of the second aspect, and the first manipulation response period ends before the end opportunity of the moving period of the moving object that is determined by the moving period determining function.

Here, when the powerful swing mode is currently selected, it is necessary to manipulate the operating unit for swinging the bat object before the ball object reaches the hitting surface. Accordingly, it is possible to realize a baseball game with reality that is more like the real-world baseball.

A fourth aspect of the present invention is the game program of the third aspec, and the second manipulation response period ends after the end opportunity of the moving period of the moving object that is determined by the moving period determining function.

Here, when the loose swing mode is currently selected, it is possible to manipulate the operating unit for swinging the bat object with a time cushion, even after the ball object reaches the hitting surface. Accordingly, it is possible to realize a baseball game with reality that is more like the real-world baseball.

A fifth aspect of the present invention is a game device for realizing a game in which a moving object is moved from a first position to a second position and an object is caused to make contact with the moving object moved to the second position by input operation of an operating unit. This game device includes game condition judging means, moving period determining means, first manipulation response period determining means, second manipulation response period determining means, manipulation input opportunity receiving means, and manipulation opportunity response judging means. In the game condition judging means, it is judged whether either a predetermined first game condition of the object or a predetermined second game condition of the object is satisfied. In the moving period determining means, a moving period in which the moving object moves from the first position to the second position is determined before the moving object starts moving. In the first manipulation response period determining means, when the predetermined first game condition is judged to be satisfied by the game condition judging means, the predetermined first manipulation response period of the object is determined, which begins at a start opportunity preceding an end opportunity of the moving period of the moving object that is determined by the moving period determining means. In the second manipulation response period determining means, when the predetermined second game condition is judged to be satisfied by the game condition judging means, a predetermined second manipulation response period of the object, which begins at a start opportunity succeeding the start opportunity of the pre- determined first manipulation response period of the object that is determined by the first manipulation response period determining means, is determined. In the manipulation input opportunity receiving means, a manipulation input opportunity, at which an input signal by a predetermined input operation of the operating unit is received, is received after the moving object starts moving. In the manipulation opportunity response judging means, it is judged whether the manipulation input opportunity of the operating unit received by the manipulation input opportunity receiving means is included in either the first manipulation response period determined by the first manipulation response period determining means or the second manipulation response period determined by the second manipulation response period determining means.

A sixth aspect of the preen invention is a game method for realizing a game in which a moving object is moved from a first position to a second position and an object is caused to make contact with the moving object moved to the second position by an input operation of an operating unit. This game method includes judging whether a predetermined first game condition of the second object is satisfied or a predetermined second game condition of the second object is satisfied, determining a moving period before the first object starts moving, the moving period being between when the first object starts moving from the first position and when the first object ends moving at the second position, selecting a predetermined first manipulation response period of the second object when the predetermined first game condition is satisfied, the predetermined first manipulation response period in which the second object temporally has a chance to contact with the first object, selecting a predetermined second manipulation response period of the second object when the predetermined second game condition is satisfied, the predetermined second manipulation response period in which the second object temporally has a chance to contact with the first object, receiving a manipulation input from the manipulating unit operated by the user, after the first object starts moving, and judging whether or not the manipulation input is received either in the predetermined first manipulation response period or the predetermined second manipulation response period.

It is judged whether either a predetermined first game condition of the object or a predetermined second game condition of the object is satisfied. A moving period that the moving object moves from the first position to the second position is determined before the moving object starts moving. When the predetermined first game condition is judged to be satisfied, a predetermined first manipulation response period of the object is determined, which begins at a start opportunity preceding an end opportunity of a moving period of the moving object that is determined. When the predetermined second game condition is judged to be satisfied, the predetermined second manipulation response period of the object is determined, which begins at a start opportunity succeeding the start opportunity of the predetermined first manipulation response period of the object that is determined. A manipulation input opportunity, at which an input signal by a predetermined input operation of the operating unit is received, is received after the moving object starts moving. It is judged whether the manipulation input opportunity of the operating unit received is included in either the first manipulation response period determined or the second manipulation response period determined.

BRIEF DESCRIPTION OF THE DRAWINGS

Referring now to the attached drawings which form a part of this original disclosure.

DETAILED DESCRIPTION OF PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
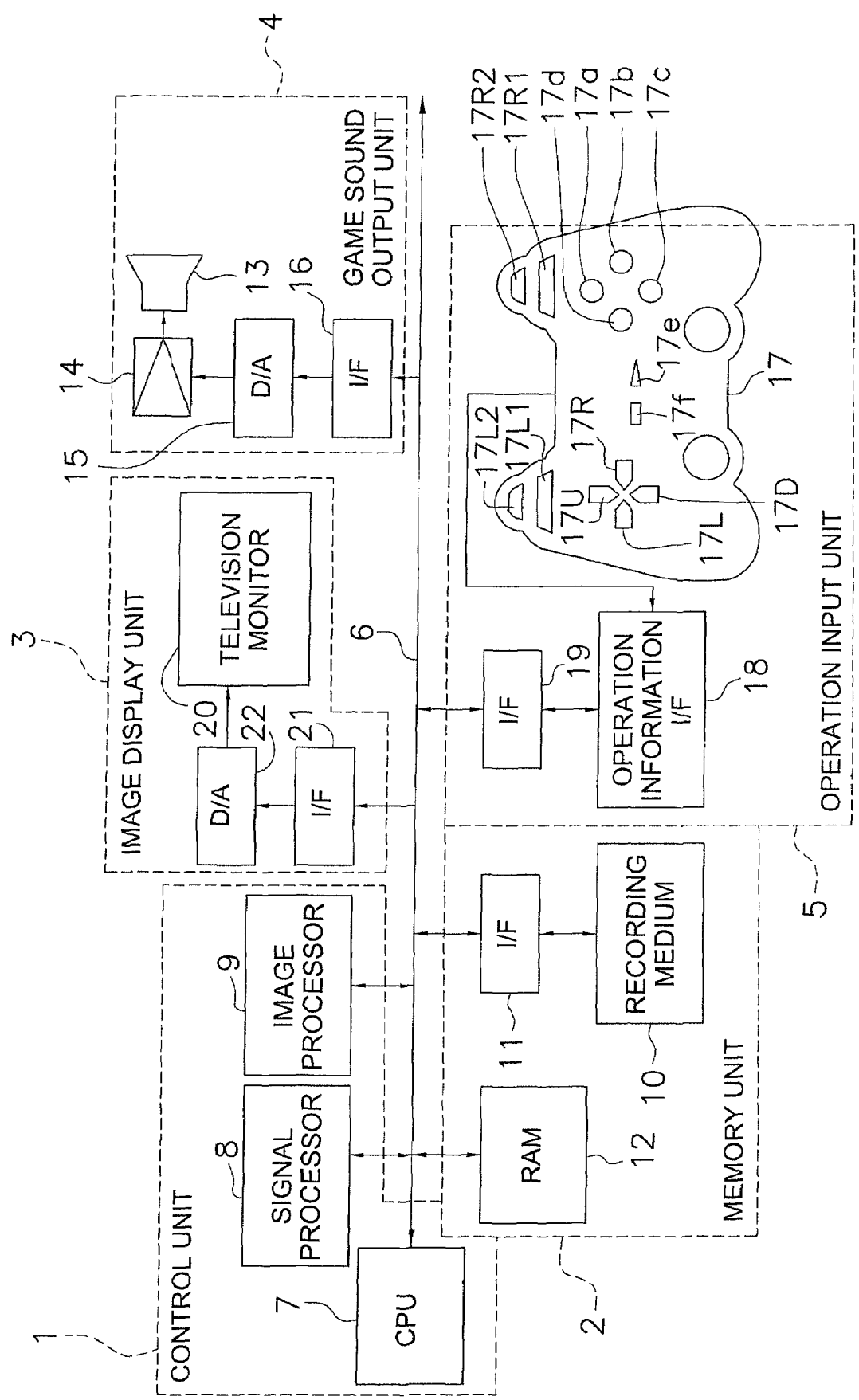
FIG. 1 is a basic configuration diagram of a video game device in accordance with an embodiment of the present invention.

Configuration and operation of game device FIG. 1 shows the basic configuration of a game device in accordance with an embodiment of the present invention. As an example of a video game device, a home video game device will be hereinafter explained. The home video game device includes a home video game console and a home television set. A recording medium 10 is configured to be allowed to be loaded in the home video game console. Game data is arbitrarily read out of the recording medium 10 and a game is executed. The content of the game executed herewith is displayed on the home television set.

The game system of the home video game device is made up of a control unit 1, a storage unit 2, an image display unit 3, an audio output unit 4, and an operation input unit 5, and these units are connected to each other through a bus 6, respectively. This bus 6 includes an address bus, a data bus, a control bus, and the like. Here, the control unit 1, the storage unit 2, the audio output unit 4, and the operation input unit 5 are included in the home video game console of the home video game device, and the image display unit 3 is included in the home television set.

The control unit 1 is provided for mainly controlling the progress of the entire game based on the game program. The control unit 1 is made up of a CPU (Central Processing Unit) 7, a signal processor 8, and an image processor 9, for instance. The CPU 7, the signal processor 8, and the image processor 9 are connected to each other through the bus 6. The CPU 7 interprets a command from a game program and performs a variety of data processing and data control. For example, the CPU 7 commands the signal processor 8 to provide the image data to the image processor. The signal processor 8 mainly performs computations in the three-dimensional space, position conversion computations from the three-dimensional space to a virtual three-dimensional space, a light source computation processing, and data generation and data processing of image data and audio data. The image processor 9 mainly performs a processing to write image data to be rendered to a RAM 12 based on the computation results and processing results of the signal processor 8.

The memory unit 2 is provided mainly for storing the program data, various types of data used for the program data, and the like. The storage unit 2 is made up of the recording medium 10, an interface circuit 11, and the RAM (Random Access Memory) 12, for instance. The interface circuit 11 is connected to the recording medium 10. The interface circuit 11 and the RAM 12 are connected through the bus 6. The recording medium 10 stores program data of the operation system, game data made up of image data, audio data, and various types of program data, and the like. For example, this recording medium 10 is a ROM (Read Only Memory) cassette, an optical disk, a flexible disk, or the like. The program data of the operating system, the game data, and the like are stored in this recording medium 10. Note that a card memory is also included in the category of the recording medium 10 and mainly used for storing various game parameters at the point of interruption when the game is interrupted. The RAM 12 is used for temporarily storing various types of data read out of the recording medium 10, and for temporarily recording the processing results from the control unit 1. In addition to various types of data, address data indicating the memory location of various types of data is stored in this RAM 12, and it is configured to be allowed to specify an arbitrary address and read/write data from/to the address.

The image display unit 3 is provided for mainly outputting the image data written to the RAM 12 by the image processor 9, the image data read out of the recording medium 10, and the like, as an image. This image display unit 3 is made up of a television monitor 20, an interface circuit 21, a D/A converter (Digital-to-Analog converter) 22, for instance. The D/A converter 22 is connected to the television monitor 20, and the interface circuit 21 is connected to the D/A converter 22. In addition, the bus 6 is connected to the interface circuit 21. Here, the image data is provided to the D/A converter 22 through the interface circuit 21, and is converted into an analog image signal in the D/A converter 22. Then, the analog image signal is outputted to the television monitor 20 as an image.

Here, the image data includes polygon data, texture data, and the like, for instance. The polygon data is the coordinate data of apexes forming the polygon. The texture data is used for setting texture with respect to the polygon, and is made up of texture specifying data and texture color data. The texture specifying data is data for associating the polygon and the texture, and the texture color data is data for specifying the texture color. Here, polygon address data and texture address data, both of which indicate memory location of each type of data, are associated with the polygon data and the texture data, respectively. With this type of image data, coordinate conversion and perspective projection conversion are performed with respect to the polygon data in the three-dimensional space (i.e., the three-dimensional polygon data) indicated with the polygon address data by the signal processor 8, based on the displacement data and the rotational data of the screen itself (i.e., point of sight). Accordingly, the polygon data is converted into the polygon data in the two-dimensional space (i.e., the two-dimensional polygon data). Then, a polygon outline is constituted with a plurality of two-dimensional polygon data, and texture data specified by the texture address data is written to the internal area of the polygon. Thus, it is possible to express objects made by applying texture to each polygon, that is, various characters.

The audio output unit 4 is provided mainly for outputting the audio data read out of the recording medium 10 as audio. The audio output unit 4 is made up of a speaker 13, an amplifier circuit 14, a D/A converter 15, and an interface circuit 16, for instance. The amplifier circuit 14 is connected to the speaker 13. The D/A converter 15 is connected to the amplifier circuit 14. The interface circuit 16 is connected to the D/A converter 15. In addition, the bus 6 is connected to the interface circuit 16. Here, the audio data is provided to the D/A converter 15 through the interface circuit 16 and is converted into an analog audio signal. The analog audio signal is amplified by the amplifier circuit 14 and is outputted from the speaker 13 as audio. ADPCM (Adaptive Differential Pulse Code Modulation) data, PCM (Pulse Code Modulation) data, and the like are included in the category of the audio data, for instance. In the case of the ADPCM data, it is possible to output the audio from the speaker 13 with almost the same type of processing method as described above. In the case of the PCM data, if the PCM data is converted into the ADPCM data in the RAM 12, it is possible to output the audio from the speaker 13 with almost the same type of processing method as described above.

The operation input unit 5 is mainly made up of a controller 17, an operation information interface circuit 18, and an interface circuit 19. The operation information interface circuit 18 is connected to the controller 17, and the interface circuit 19 is connected to the operation information interface circuit 18. In addition, the bus 6 is connected to the interface circuit 19.

The controller 17 is an operation unit used by the video game player for the purpose of inputting various operation commands, and transmits operation signals to the CPU 7 according to the video game player's operation. The controller 17 is provided with a first button 17a, a second button 17b, a third button 17c, a fourth button 17d, an up key 17U, a down key 17D, a left key 17L, a right key 17R, a L1 button 17L1, a L2 button 17L2, a R1 button 17R1, a R2 button 17R2, a start button 17e, a select button 17f, a left stick 17SL, and a right stick 17SR.

The up key 17U, the down key 17D, the left key 17L, and the right key 17R are used for providing the CPU 7 with a command to cause the characters and a cursor to move up, down, left, and right on the screen of the television monitor 20, for instance.

The start button 17e is used for commanding the CPU 7 to load the game program from the recording medium 10, for instance.

The select button 17f is used for commanding the CPU 7 to execute various selections with respect to the game program loaded from the recording medium 10, for instance.

The left stick 17SL and the right stick 17SR are stick-shaped controllers with approximately the same configuration as a so-called joystick. This stick-shaped controller includes an upright stick. This stick is configured to be allowed to lean from the upright position to 360-degree directions including front, back, left, and right directions, centering around the fulcrum. The left stick 17SL and the right stick 17SR transmit x and y coordinate values with the origin corresponding to the upright position thereof to the CPU 7 through the operation information interface circuit 18 and the interface circuit 19 as the operation signal according to the direction and angle of the leaned stick.

Various functions are allocated to the first button 17a, the second button 17b, the third button 17c, the fourth button 17d, the L1 button 17L1, the L2 button 17L2, the R1 button 17R1, and the R2 button 17R2 according to the game program that is loaded from the recording medium 10.

Note that each button and each key provided in the controller 17 excluding the left stick 17SL and the right stick 17SR are configured to function as ON/OFF switches that becomes an on-state when pressed from the neutral position by the external pressure and becomes an off-state when the pressure is released and returns to the neutral position.

The general operations of the home video game device configured as described above will be hereinafter explained. If a power switch (not illustrated in the figure) is turned on and the game system 1 is powered on, the CPU 7 reads out image data, audio data, and program data from the recording medium 10 based on the operating system stored in the recording medium 10. All or part of the read-out data including the image data, the audio data, and the program data are stored in the RAM 12. Then, the CPU 7 issues commands for the image data and the audio data, both of which are stored in the RAM 12, based on the program data stored in the RAM 12.

In the case of image data, the signal processor 8 firstly performs positional computation, light source computation, and the like for a character in the three-dimensional space based on the command from the CPU 7. Next, the image processor 9 performs a processing of writing the image data to be rendered to the RAM 12 based on the computation results by the signal processor 8. Then, the image data written to the RAM 12 is provided to the D/A converter 22 through the interface circuit 21. Here, the image data is converted into an analog image signal by the D/A converter 22. Then, the image data is provided to the television monitor 20 and displayed as an image.

In the case of the audio data, the signal processor 8 firstly performs processing to generate and process audio data based on the command from the CPU 7. Here, processing, such as pitch conversion, noise addition, envelope setting, level setting, and reverb addition, is performed for the audio data. Next, the audio data is outputted from the signal processor 8 and is provided to the D/A converter 15 through the interface circuit 16. Here, the audio data is converted into an analog audio signal. Then, the audio data is outputted as the audio from the speaker 13 through the amplifier circuit 14.

Summary of Various Processing in Game Device

Figure 2:
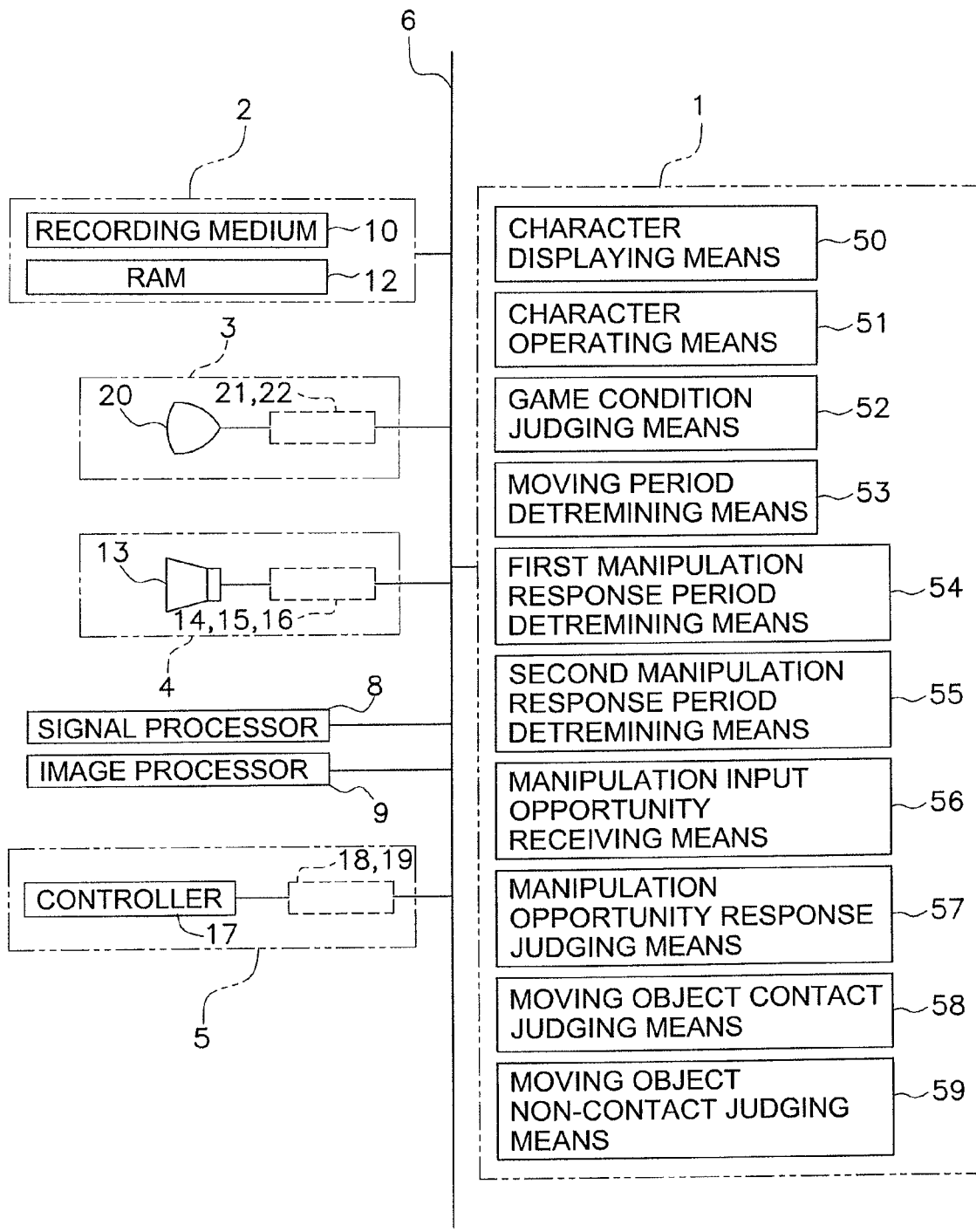
FIG. 2 is a functional block diagram as an example of the video game device.

The game executed in the present game console is a baseball game, for instance. The present game console is configured to realize a game in which a character displayed on the television monitor 20 is caused to perform an action by manipulating the controller 17. FIG. 2 is a functional block diagram for explaining functions that play a major role in the present invention. The control unit 1 mainly includes character displaying means 50, character operating means 51, game condition judging means 52, moving period determining means 53, first manipulation response period determining means 54, second manipulation response period determining means 55, manipulation input opportunity receiving means 56, manipulation opportunity response judging means 57, moving object contact judging means 58, and moving object non-contact judging means 59.

The character displaying means 50 includes a function of displaying a pitcher character 71 and a batter character 72 on the television monitor 20. In the character displaying means 50, the pitcher character 71 and the batter character 72 are displayed on the television monitor 20.

In the means, when the game program is loaded, pitcher image data corresponding to the pitcher character 71 and batter image data corresponding to the batter character 72 are provided from the storage unit 2 (e.g., recording medium 10)

to the RAM 12, and are stored in the RAM 12. Here, the pitcher image data and the pitcher coordinate date are recognized by the control unit 1 (e.g., the CPU 7). In addition, batter coordinate data for displaying the batter image data on the television monitor 20, and pitcher coordinate data for displaying the pitcher image data on the television monitor 20 are provided from the storage unit 2 (e.g., recording medium 10) to the RAM 12, and are stored in the RAM 12. Here, the batter image data and the batter coordinate data are recognized by the control unit 1 (e.g., the CPU 7). Then, the batter image data and the pitcher image data, which are stored in the RAM 12, are provided to the television monitor 20 through the image processor 9, based on an instruction by the CPU 7. Then, the batter image data and the pitcher image data are displayed in a predetermined position of the television monitor 20 based on the batter coordinate data and the pitcher coordinate data. Note that an instruction for displaying the batter image data and the pitcher image data in the predetermined position of the television monitor 20 is issued by the CPU 7.

Character operating means 51 includes a function of causing the pitcher character 71 and the batter character 72 to perform an action. In the character operating means 51, the pitcher character 71 and the batter character 72 are caused to perform an action.

In this means, when a signal for causing the pitcher character 71 and the batter character 72 to perform an action, which is transmitted from the controller 17, is recognized by the control unit 1 (e.g., CPU 7), the pitcher image data corresponding to the pitcher character 71 and the batter image data corresponding to the batter character 72 are processed by the control unit 1 (e.g., signal processor 8 and image processor 9) based on an instruction by the CPU 7. Then, the processed image data are provided from the RAM 12 to the television monitor 20, and pitching motion of the pitcher character 71 and swinging motion of the batter character 72 are displayed on the television monitor 20 as motion pictures.

Figure 3:
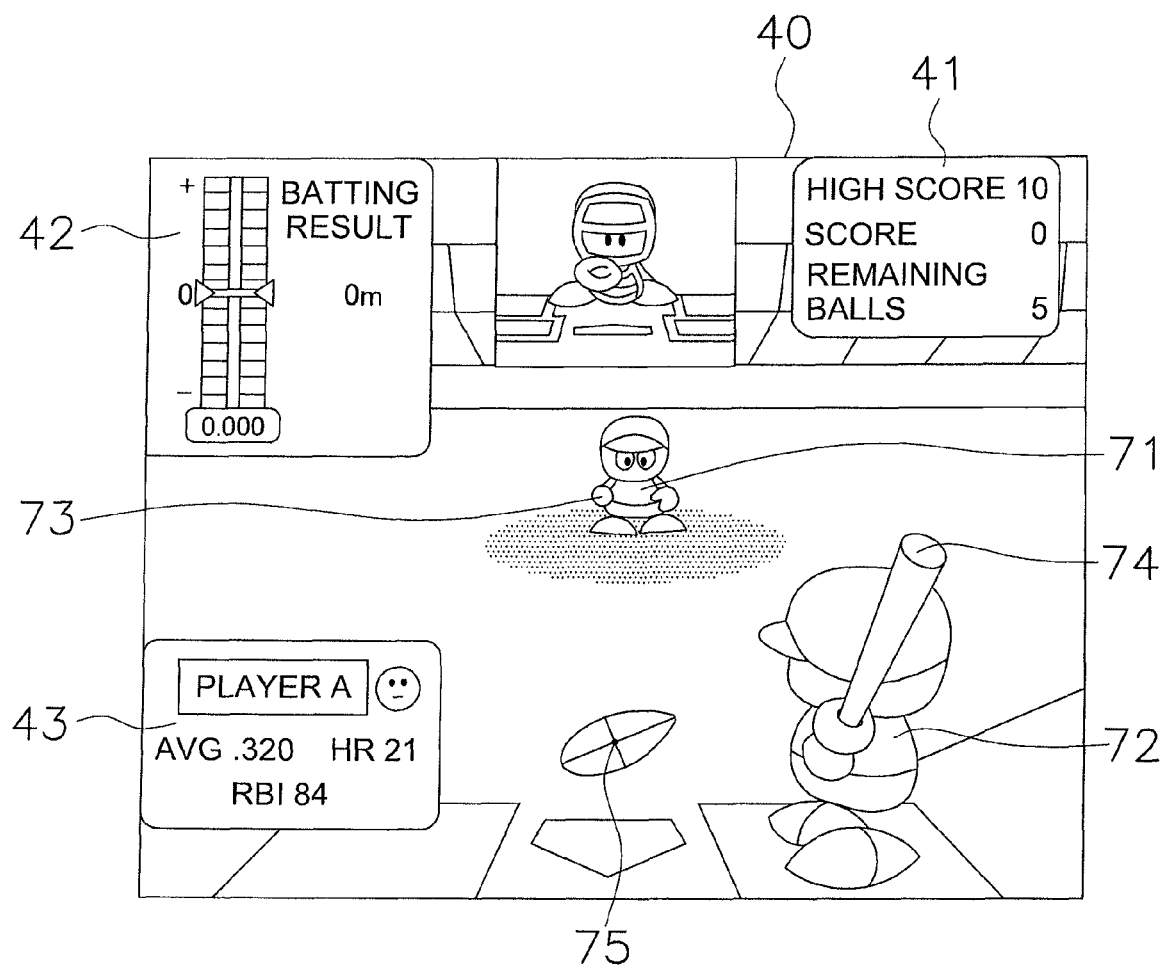
FIG. 3 is a diagram of a television monitor for illustrating a versus display screen at the start of batting on a loose swing mode.
Figure 4:
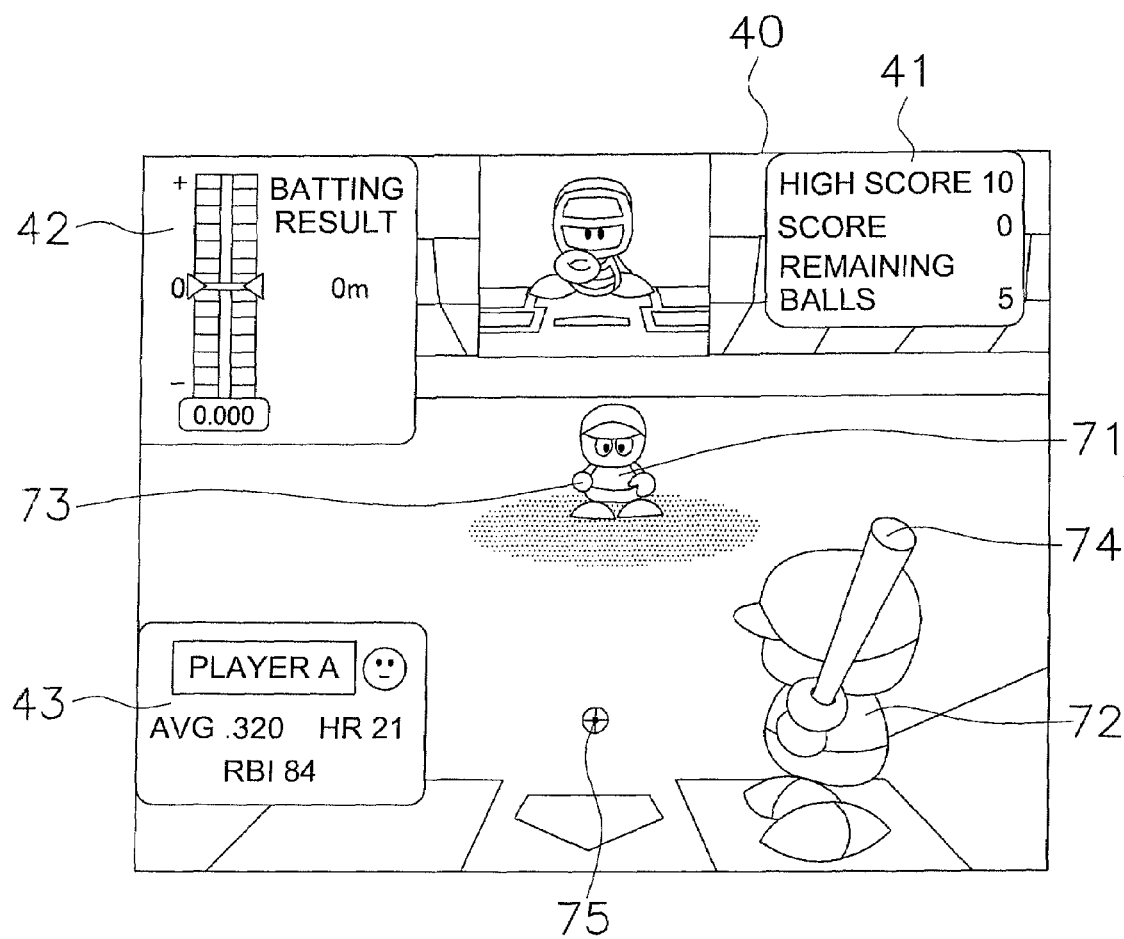
FIG. 4 is a diagram of a television monitor for illustrating a versus display screen at the start of batting on a powerful swing mode.
Figure 5:
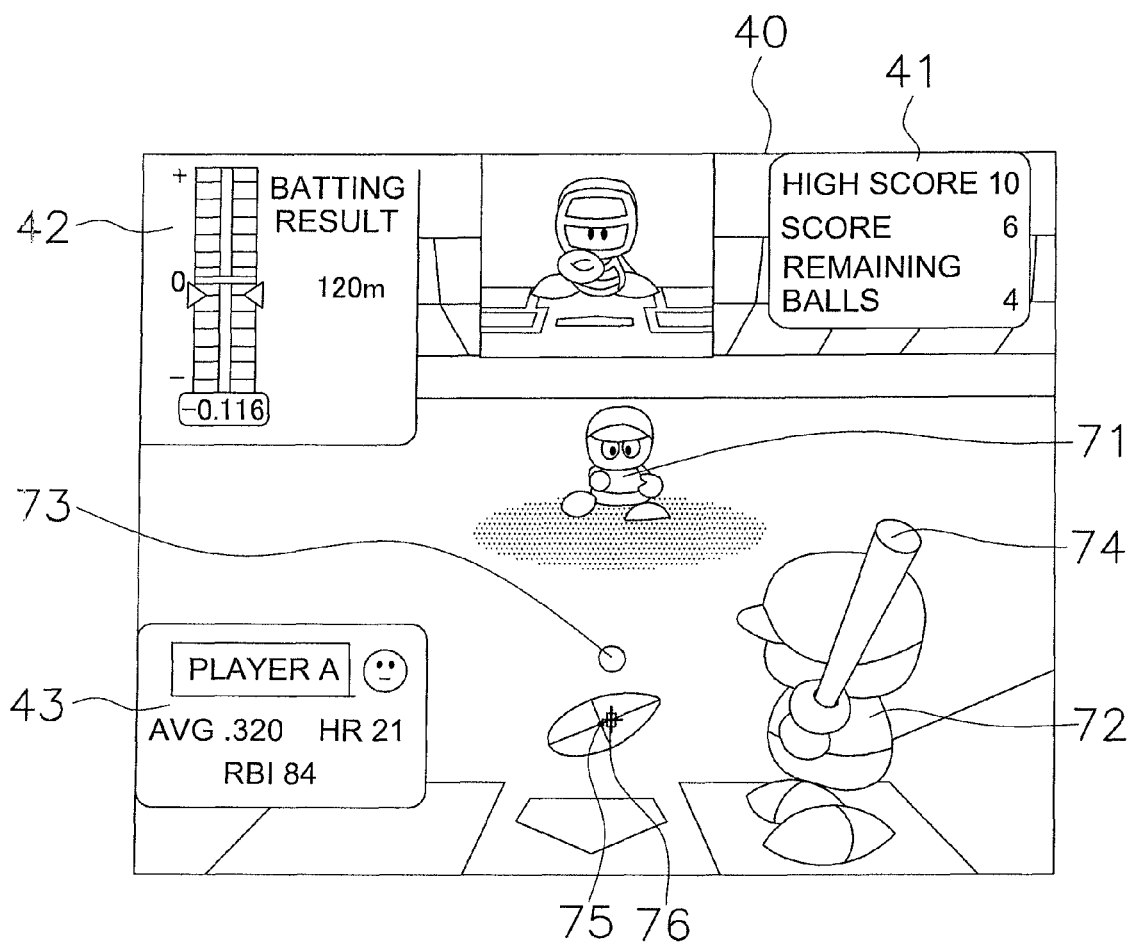
FIG. 5 is a diagram of a television monitor for illustrating a versus display screen at the time of batting and at the end of batting on the loose swing mode.
Figure 6:
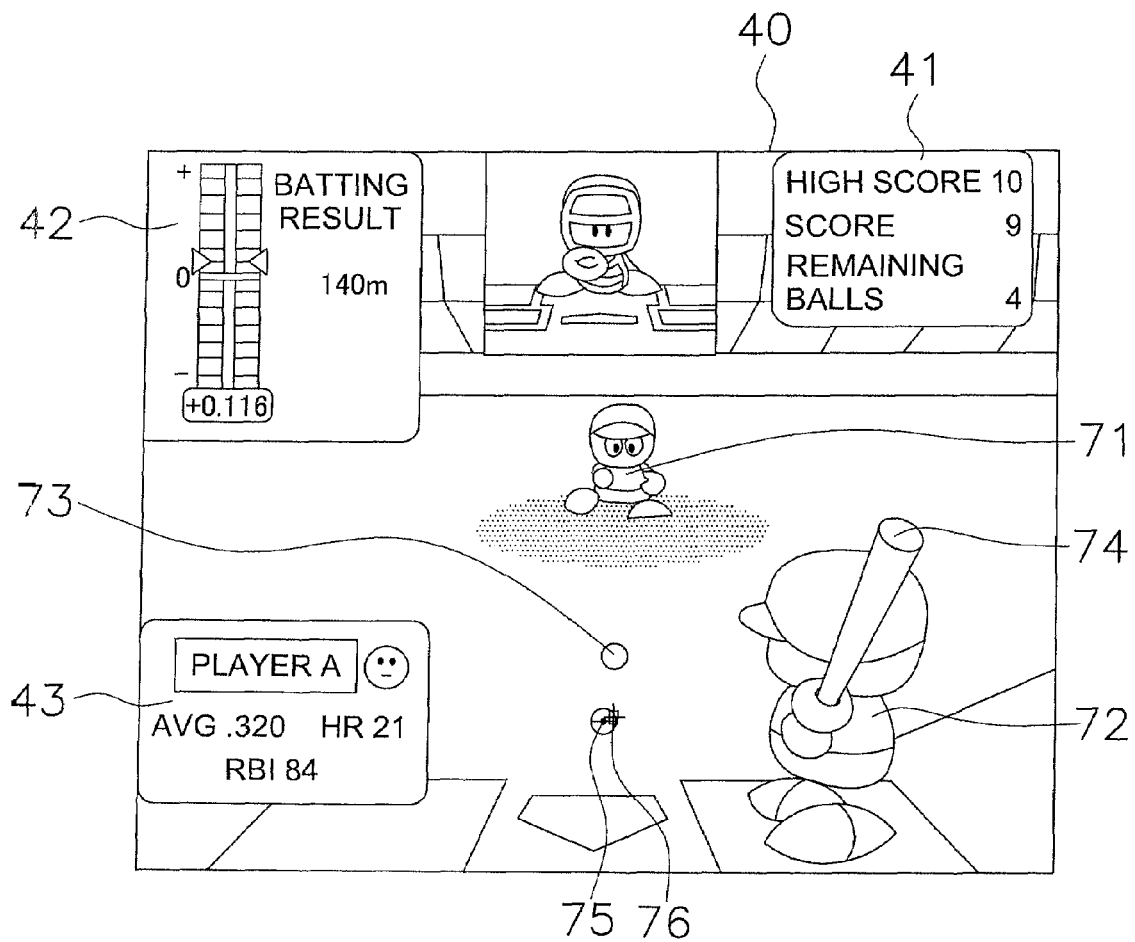
FIG. 6 is a diagram of a television monitor for illustrating a versus display screen at the time of batting and at the end of batting on the powerful swing mode.

Game condition judging means 52 includes a function of judging whether either a predetermined first game condition of the object or a predetermined second game condition of the object is satisfied. In the game condition judging means 52, it is judged whether either the predetermined first game condition of the object or the predetermined second game condition of the object is satisfied. Here, the predetermined first game condition of the object is a condition of a contact hitting cursor 75 illustrated in FIGS. 4 and 6. Here, the condition is a powerful swing mode having a feature that the area of the contact hitting cursor 75 illustrated in FIGS. 4 and 6 is small and the flying distance of a batted ball is long. On the other hand, the predetermined second game condition of the object is a condition of a contact hitting cursor 75 illustrated in FIGS. 3 and 5. Here, the condition is a loose swing mode having a feature that the area of the contact hitting cursor 75 illustrated in FIGS. 3 and 5 is large and the flying distance of a batted ball is short. In the game condition judging means 52, it is judged whether which mode is currently selected among the powerful swing mode that is the predetermined first game condition of the object, and the loose swing mode that is the predetermined second game condition of the object. Here, a variety of data including information that which mode is selected as the present mode, which is recognized by the game condition judging means 52, is stored in the RAM 12.

Figure 7:
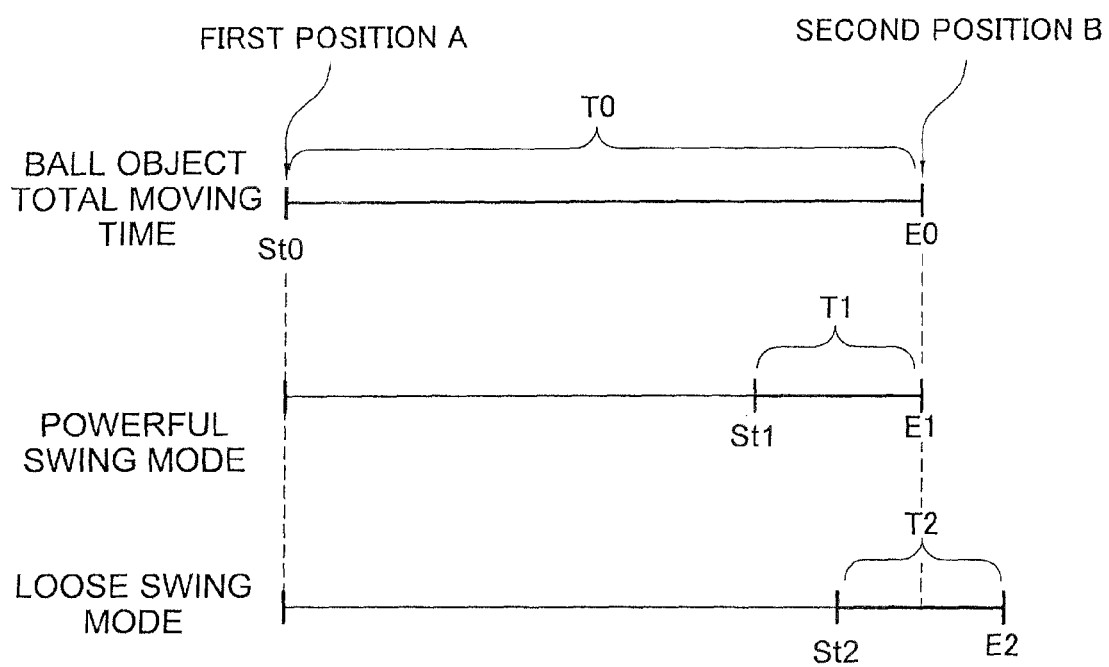
FIG. 7 is a schematic diagram for illustrating relative relations among the total moving time of a ball object, a first manipulation response period, and a second manipulation response period.

The moving period determining means 53 includes a function of determining a moving period T0 illustrated in FIG. 7 in which a ball object 73 moves from a first position A illustrated in FIG. 7 to a second position B illustrated in FIG. 7 before the ball object 73 illustrated in FIGS. 3-6 starts moving. In the moving period determining means 53, the moving period T0 in which the ball object 73 moves from the first position A to the second position B is determined before the ball object 73 starts moving. Here, as illustrated in FIG. 7, the moving period T0 is determined, which is the time elapsed while the ball object 73 moves from the pitching position (the first position A, that is, the surface from which the ball object 73 is released) of the pitcher character 71 to the batting position (the second position B, that is, the hitting surface that the ball object 73 reaches) of the batter character 72. Here, the moving period T0 is the time elapsed from the pitching start opportunity St0 illustrated in FIG. 7 when the ball object 73 is released to the pitching end opportunity E0 illustrated in FIG. 7 when the ball object 73 reaches the hitting surface. Note the term "opportunity" herein means instant such as time of a day and timing, and is used distinctly from the term "period" that means the time elapsed from a start opportunity to an end opportunity. Here, a variety of data such as the moving period T0 in which the ball object 73 moves from the first position A to the second position B, which is determined by the moving period determining means 53, the pitching start opportunity St0 at which the ball object 73 is released, and the pitching end opportunity E0 at which the ball object 73 reaches the hitting surface, are stored in the RAM 12.

The first manipulation response period determining means 54 includes a function of determining a predetermined first manipulation response period of the object, which begins at a start opportunity preceding an end opportunity of the moving period of the moving object that is determined by the moving period determining means 53 when the predetermined first game condition is judged to be satisfied by the game condition judging means 52. In the first manipulation response period determining means 54, when the predetermined first game condition is judged to be satisfied by the game condition judging means 52, as illustrated in FIG. 7, a predetermined first manipulation response period T1 of the object is determined, which begins at a first manipulation response start opportunity St1 preceding a pitching end opportunity E0 of the moving period T0 of the moving object that is determined by the moving period determining means 53. Here, when the moving period T0 in which the ball object 73 moves from the first position A to the second position B is determined by the moving period determining means 53, the predetermined first manipulation response period T1 of the bat object 74, which is illustrated in FIGS. 3-6 and begins at the first manipulation response start opportunity St1 preceding the pitching end opportunity E0 of the moving period T0 of the ball object 73 that is determined by the moving period determining means 53, is determined by the first manipulation response period determining means 54 when the predetermined first game condition is judged to be satisfied by the game condition judging means 52, in other words, when the powerful swing mode is judged to be currently selected by the game condition judging means 52. Here, the predetermined first manipulation response period T1 of the bat object 74 is the manipulation response time with respect to an operation of pressing the third button 17c of the controller 17 for allowing the ball object 73 to be hit back on the powerful swing mode, and is the time elapsed from the first manipulation response staring opportunity St1 illustrated in FIG. 7 to the first manipulation response end opportunity E1 illustrated in FIG. 7. In addition, as illustrated in FIG. 7, the predetermined first manipulation response period T1 of the bat object 74 is configured to end before the pitching end opportunity E0 of the moving period T0 of the ball object 73 that is determined by the moving period determining means 53. In other words, the first manipulation response end opportunity E1 of the first manipulation response period T1 precedes the pitching end opportunity E0 of the moving period T0 of the ball object 73. Here, a variety of data such as the predetermined first manipulation response period T1 of the bat object 74, which is determined by the first manipulation response period determining means 54, the first manipulation response start opportunity St1, and the first manipulation response end opportunity E1, are stored in the RAM 12.

The second manipulation response period determining means 55 includes a function of determining a predetermined second manipulation response period T2 of the object, which begins at a second manipulation response start opportunity St2 succeeding the first manipulation response start opportunity St1 of the first manipulation response period T1 of the object that is determined by the first manipulation response period determining means 54 when the predetermined second game condition is judged to be satisfied by the game condition judging means 52. In the second manipulation response period determining means 55, when the predetermined second game condition is judged to be satisfied by the game condition judging means 52, as illustrated in FIG. 7, the predetermined second manipulation response period T2 of the bat object 74 is determined, which begins at the second manipulation response start opportunity St2 succeeding the first manipulation response start opportunity St1 of the predetermined first manipulation response period T1 of the bat object 74 that is determined by the first manipulation response period determining means 54. Here, when the moving period T0 of the ball object 73 is determined by the moving period determining means 53, the predetermined second manipulation response period T2 of the bat object 74, which begins at the second manipulation response start opportunity St2 succeeding the first manipulation response start opportunity St1 of the predetermined first manipulation response period T1 of the bat object 74 that is determined by the first manipulation response period determining means 54, is determined by the second manipulation response period determining means 55 when the predetermined second game condition is judged to be satisfied by the game condition judging means 52, in other words, when the loose swing mode is judged to be currently selected by the game condition judging means 52. Here, the predetermined second manipulation response period T2 of the bat object 74 is the manipulation response time with respect to an operation of pressing the third button 17c of the controller 17 for allowing the ball object 73 to be hit back on the loose swing mode, and is the time elapsed from the second manipulation response start opportunity St2 illustrated in FIG. 7 to the second manipulation response end opportunity E2 illustrated in FIG. 7. Here, the first manipulation response start opportunity St1 of the predetermined first manipulation response period T1 of the bat object 74 on the powerful swing mode is set to precede the second manipulation response start opportunity St2 of the predetermined second manipulation response period T2 of the bat object 74 on the loose swing mode. In addition, as illustrated in FIG. 7, the predetermined second manipulation response period T2 of the bat object 74 is configured to end after the pitching end opportunity E0 of the moving period T0 of the ball object 73 that is determined by the moving period determining means 53. In other words, the second manipulation response end opportunity E2 of the second manipulation response period T2 succeeds the pitching end opportunity E0 of the moving period T0 of the ball object 73. Here, a variety of data such as the predetermined second manipulation response period T2 of the bat object 74, which is determined by the second manipulation response period determining means 55, the second manipulation response start opportunity St2, and the second manipulation response end opportunity E2, are stored in the RAM 12.

The manipulation input opportunity receiving means 56 includes a function of receiving a manipulation input opportunity HP at which an input signal generated by a predetermined input manipulation of the controller 17 is received after the moving object starts moving. In the manipulation input opportunity receiving means 56, the manipulation input opportunity HP, at which an input signal generated by a predetermined input manipulation of the controller 17 is received, is received after the moving object starts moving. Here, the manipulation input opportunity HP, at which the third button 17c of the controller 17 is pressed for the purpose of causing the bat object 74 to swing, is received after the ball object 73 is pitched by the pitcher character 71. Here, the manipulation input opportunity HP means instant at which an input operation such as the time and the timing at which when the third button 17c of the controller 17 is pressed. Here, a variety of data including the manipulation input opportunity HP at which the third button 17c of the controller 17 is pressed, which is received by the manipulation input opportunity receiving means 56, are stored in the RAM 12.

The manipulation opportunity response judging means 57 includes a function of judging if the manipulation input opportunity HP at which the third button 17c of the controller 17 is pressed, which is received by the manipulation input opportunity receiving means 56, is included in either the first manipulation response period T1 determined by the first manipulation response period determining means 54 or the second manipulation response period T2 determined by the second manipulation response period determining means 55. In the manipulation opportunity response judging means 57, it is judged whether the manipulation input opportunity HP at which the third button 17c of the controller 17 is pressed, which is received by the manipulation input opportunity receiving means 56, is included in either the first manipulation response period T1 determined by the first manipulation response period determining means 54 or the second manipulation response period T2 determined by the second manipulation response period determining means 55. Here, when the powerful swing mode is currently selected, it is judged whether the manipulation input opportunity HP, at which the third button 17c of the controller 17 is pressed, is included in the predetermined first manipulation response period T1 of the bat object 74 on the powerful swing mode. On the other hand, when the loose swing mode is currently selected, it is judged whether the manipulation input opportunity HP, at which the third button 17c of the controller 17 is pressed, is included in the predetermined second manipulation response period T2 of the bat object 74 on the loose swing mode. Here, a variety of data such as the judgment result determined by the manipulation opportunity response judging means 57 are stored in the RAM 12.

The moving object contact judging means 58 includes a function of judging that the object makes contact with the moving object when the manipulation input opportunity HP at which the third button 17c of the controller 17 is pressed, which is received by the manipulation opportunity response judging means 57, is judged to be included in either the first manipulation response period T1 or the second manipulation response period T2. In the moving object contact judging means 58, when the manipulation input opportunity HP, at which the third button 17c of the controller 17 is pressed, is judged to be included in either the first manipulation response period T1 or the second manipulation response period T2, the bat object 74 is judged to make contact with the ball object 73. Here, when either the powerful swing mode or the loose swing mode is currently selected, the ball object 73 is judged to be allowed to be hit back, that is, the ball object 73 is judged to be cleanly hit, by the moving object contact judging means 58 when the manipulation input opportunity HP, at which the third button 17c of the controller 73 is pressed, is included in either the predetermined first manipulation response period T1 of the bat object 74 on the powerful swing mode or the predetermined second manipulation response period T2 of the bat object 74 on the loose swing mode. Here, a variety of data such as the judgment result determined by the moving object contact judging means 58 are stored in the RAM 12.

The moving object non-contact judging means 59 includes a function of judging that the object does not make contact with the moving object when the manipulation input opportunity of the operating unit, which is received by the manipulation opportunity response judging means 57, is judged not to be included in either the first manipulation response period or the second manipulation response period. In the moving object non-contact judging means 59, when the manipulation input opportunity HP, at which the third button 17c of the controller 17 is pressed, is judged not to be included in either the first manipulation response period T1 or the second manipulation response period T2, the bat object 74 is judged not to make contact with the ball object 73. Here, when either the powerful swing mode or the loose swing mode is currently selected, the ball object 73 is judged not to be allowed to be hit back, that is, the ball object 73 is judged to be mishit, by the moving object non-contact judging means 59 when the manipulation input opportunity HP, at which the third button 17c of the controller 73 is pressed, is not included either in the predetermined first manipulation response period T1 of the bat object 74 on the powerful swing mode or the predetermined second manipulation response period T2 of the bat object 74 on the loose swing mode. Here, a variety of data determined by the moving object non-contact judging means 59 are stored in the RAM 12.

Here, in the manipulation opportunity response judging means 57, when the powerful swing mode is judged to be currently selected by the game condition judging means 52, the predetermined first manipulation response period T1 of the bat object 74 is determined, which begins at the first manipulation response start opportunity St1 preceding the pitching end opportunity E0 of the moving period T0 of the ball object 73. In addition, in the manipulation opportunity response judging means 57, when the loose swing mode is judged to be currently selected by the game condition judging means 52, the predetermined second manipulation response period T2 of the bat object 74 is determined, which begins at the second manipulation response start opportunity St2 S2 succeeding the first manipulation response start opportunity St1 of the predetermined first manipulation response period T1 of the bat object 74. Then, it is judged by the moving object contact judging means 58 whether the ball object 73 is cleanly hit, and it is judged by the moving object non-contact judging means 59 whether the ball object 73 is not allowed to be hit back, that is, the ball object 73 is mishit.

In this case, the first manipulation response start opportunity St1 of the predetermined first manipulation response period T1 of the bat object 74 on the powerful swing mode is set to precede the second manipulation response start opportunity St2 of the predetermined second manipulation response period T2 of the bat object 74 on the loose swing mode. Therefore, it is possible to set the timing of pressing the third button 17c of the controller 17 on the powerful swing mode to be faster than the timing of pressing the third button 17c of the controller 17 on the loose swing mode. Because of this, in this game program, it is possible to realize a situation that the timing of hitting a ball with a bat when the bat is powerfully swung is perceived to be faster than the timing of hitting a ball with a bat when the bat is loosely swung. Accordingly, it is possible to realize a baseball game with reality that is more like the real-world baseball.

Summary of Television Monitor Display Screen in Baseball Game

Next, the specific content of a display screen displayed on the television monitor 20 in a baseball game will be explained with reference to versus display screens 40 illustrated in FIGS. 3-6.

As illustrated in FIGS. 3-6, in the present baseball game, a game is performed as follows: the control unit 1 causes the pitcher character 71 to perform an action, and a game player manipulates the batter character 72 (the bat object 74, and the contact hitting cursor 75) for hitting back the ball object 73 released from the pitcher character 71. Especially, in this type of baseball game, a game player is allowed to select and play a mode on which the game player is allowed to concentrate on batting practice of the batter character 72, that is, a home run race mode on which the batter character 72 manipulated by the game player competes with other batter characters with respect to the number of homeruns. The versus display screens 40 illustrated in FIGS. 3-6 are the versus display screens on the home run race mode.

As illustrated in FIGS. 3-6, the versus display screen 40 includes the batter character 71 disposed in the center of the screen, the batter character 72 disposed in the bottom of the screen, the ball object 73 movable from the pitcher character 71 in the direction of the batter character 72, the bat object 74 disposed to be allowed to be swung by the batter character 72, the contact hitting cursor 75 disposed on the home base, which is the hitting surface that the ball object 73 reaches, and the ball object terminal position 76 (see FIGS. 5 and 6), which is a position on the hitting surface that the ball object 73 is expected to reach while the ball object 73 moves. The pitcher character 71, the batter character 72, the ball object 73, the bat object 74, the contact hitting cursor 75, and the ball object terminal position 76 have the configuration that actions of the pitcher character 71, the batter character 72, the ball object 73, the bat object 74, the contact hitting cursor 75, and the ball object terminal position 76 are displayed on the television monitor 20 by continuously moving image data (e.g., polygon data) corresponding to the pitcher character 71, the batter character 72, the ball object 73, the bat object 74, the contact hitting cursor 75, and the ball object terminal position 76 when commands for causing the pitcher character 71, the batter character 72, the ball object 73, the bat object 74, the contact hitting cursor 75, and the ball object terminal position 76 to perform actions are issued by the control unit 1 based on the game program.

It is possible to cause the contact hitting cursor 75 to perform an action in the up, down, right, and left directions on the screen depending on the manipulation of the up key 17U, the down key 17D, the left key 17L, and the right key 17R of the controller 17. In addition, it is possible to switch the contact hitting cursor 75 between the loose swing mode on which the contact hitting cursor 75 is formed in horizontally-long and approximately rain drop shape as illustrated in FIGS. 3 and 5 and the area thereof for capturing the ball object 73 is large, and the powerful swing mode on which the contact hitting cursor 75 is formed in a circular shape to be smaller than the contact hitting cursor 75 on the loose swing mode as illustrated in FIGS. 4 and 6 and the area thereof for capturing the ball object is small, by pressing the R1 button 17R1 and the R2 button 17R2 of the controller 17. Here, the loose swing mode with the large contact hitting cursor 75 illustrated in FIGS. 3 and 5 and the powerful swing mode with the small contact hitting cursor 75 illustrated in FIGS. 4 and 6 are configured to be switched by pressing the R1 button 17R1 and the R2 button 17R2 of the controller 17. Then, after the ball object 73 is released by the pitcher character 71 (see FIGS. 5 and 6), the contact hitting cursor 75 is moved by manipulating the up key 17U, the down key 17D, the left key 17R, and the right key 17R of the controller 17, and thus the center part of the contact hitting cursor 75 is matched with the center part of the ball object terminal position 76. If the third button 17c of the controller 17 is pressed when the center part of the contact hitting cursor 75 is matched with the center part of the ball object terminal position 76, the bat object 74 is configured to be swung and the ball object 73 is configured to be hit back.

In addition, the versus display screen 40 further includes a batting score result display area 41 disposed in the upper right side on the screen, a batting swing result display area 42 disposed in the upper left side on the screen, and a batting overall result display area 43 disposed on the opposite side (left side in FIGS. 3-6) from the side of the batter character 72 disposed on the bottom of the screen. The high score, the present score, and the remaining number of battings are displayed in the batting score result display area 41. The gauge for showing the timing of batting swing and flying distance are displayed in the batting swing result display area 42. The gauge for showing timing of batting swing indicates that the terminal position of the ball object 73 and the timing when the bat object 74 is swung, that is, the timing when the third button 17c of the controller 17 is pressed, are further matched as an indicator of the gauge is closely positioned to the zero position. When the indicator is positioned in the plus position of the game, it is indicated that swing is performed before the indicator reaches the zero position. On the other hand, when the indicator is positioned in the minus position of the gauge, it is indicated that swing is performed after the indicator reaches the zero position. Especially, on the loose swing mode illustrated in FIG. 5, the indicator of the gauge is positioned in the minus position and swing is performed after the indicator reaches the zero position. However, as described above, the predetermined second manipulation response period T2 of the bat object 74 is configured to end after the pitching end opportunity E0 of the moving period T0 of the ball object 73. Accordingly, it is judged that the ball object is cleanly hit. In the similar way to this, on the powerful swing mode illustrated in FIG. 6, the indicator of the gauge is positioned in the plus position and swing is performed before the indicator reaches the zero position. However, as described above, the predetermined first manipulation response period T1 of the bat object 74 is configured to end before the pitching end opportunity E0 of the moving period T0 of the ball object 73. Accordingly, it is judged that the ball is cleanly hit.

Figure 8:
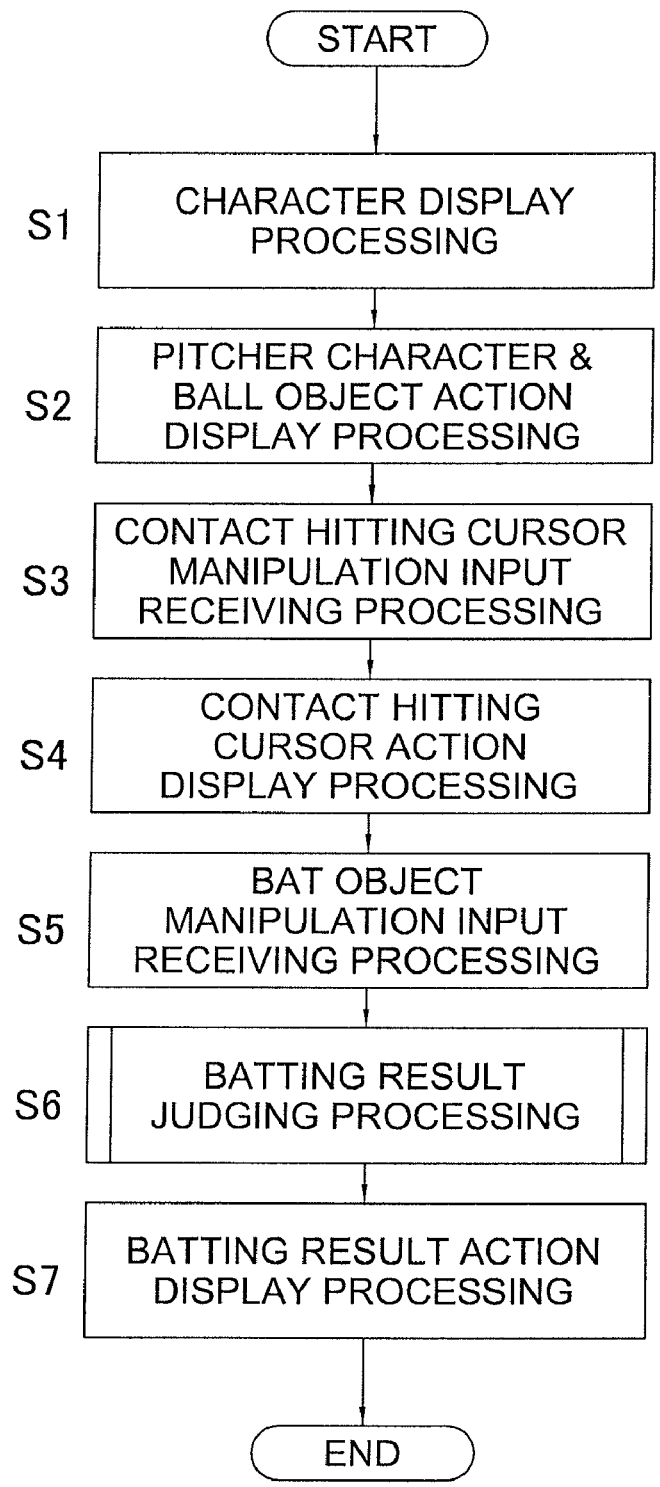
FIG. 8 is a flowchart for explaining a character action display processing.

Processing Flow Performed in Character Action Display System and Batting Result Judgment System in Baseball Game A character action display system and a batting result judgment system in the baseball game of the present embodiment will be explained with reference to flowcharts illustrated in FIGS. 8 and 9.

First, as illustrated in FIGS. 3 and 4, the pitcher character 71, the batter character 72, the ball object 73, the bat object 74, and the contact hitting cursor 75 are displayed on the versus display screen 40 (S1). In Step S1, the pitcher character 71 and the batter character 72 are displayed in a condition that the pitcher character 71 holds the ball object 73 and the batter character 72 holds the bat object 74. In addition, in Step S1, it is possible to switch between the loose swing mode with large contact hitting cursor 75 illustrated in FIG. 3 and the powerful swing mode with small contact hitting cursor 75 illustrated in FIG. 4 by pressing the R1 button 17R1 and the R2 button 17R2 of the controller 17. Then, the contact hitting cursor 75 of the selected mode will be displayed.

Next, as illustrated in FIGS. 5 and 6, when the pitcher character 71 starts pitching the ball object 73, the pitching motion of the pitcher character 71 and the scene that the ball object 73 moves are displayed (S2). In Step S2, the pitcher character 71 and the ball object 73 have a configuration that actions of the pitcher character 71 and the ball object 73 are displayed on the television monitor 20 by continuously moving image data (polygon data) corresponding to the pitcher character 71 and the ball object 73 when commands for causing the pitcher character 71 and the ball object 73 to perform actions are issued by the control unit 1 based on the game program.

Next, a manipulation input through the up key 17U, the down key 17D, the left key 17L, and the right key 17R of the controller 17 is received (S3), the contact hitting cursor 75 is displayed on the screen such that the contact hitting cursor 75 is caused to perform an action in the up, down, right, and left directions depending on the received manipulation input (S4). In Step S4, when a command for causing the contact hitting cursor 75 to perform an action is issued by the control unit 1 based on manipulation of the up key 17U, the down key 17D, the left key 17L, and the right key 17R of the controller 17, action of the contact hitting cursor 75 is configured to be displayed on the television monitor 20 by continuously moving the image data (e.g., polygon data) corresponding to the contact hitting cursor 75.

Next, the contact hitting cursor 75 is moved by manipulating the up key 17U, the down key 17D, the left key 17R, and the right key 17R of the controller 17, and then the center part of the contact hitting cursor 75 is matched with the center part of the ball object terminal position 76. If the third button 17c of the controller 17 is pressed when the center part of the contact hitting cursor 75 is matched with the center part of the ball terminal position 76, an input operation of pressing the third button 17c of the controller 17 for swinging the bat object 74 is received (S5). In Step S5, the manipulation input opportunity HP, at which the third button 17c of the controller 17 is pressed, is stored in the RAM 12, and the present processing is moved to a batting result judgment processing for judging the batting result depending on the timing of pressing the third button 17c of the controller 17 (S6).

Figure 9:
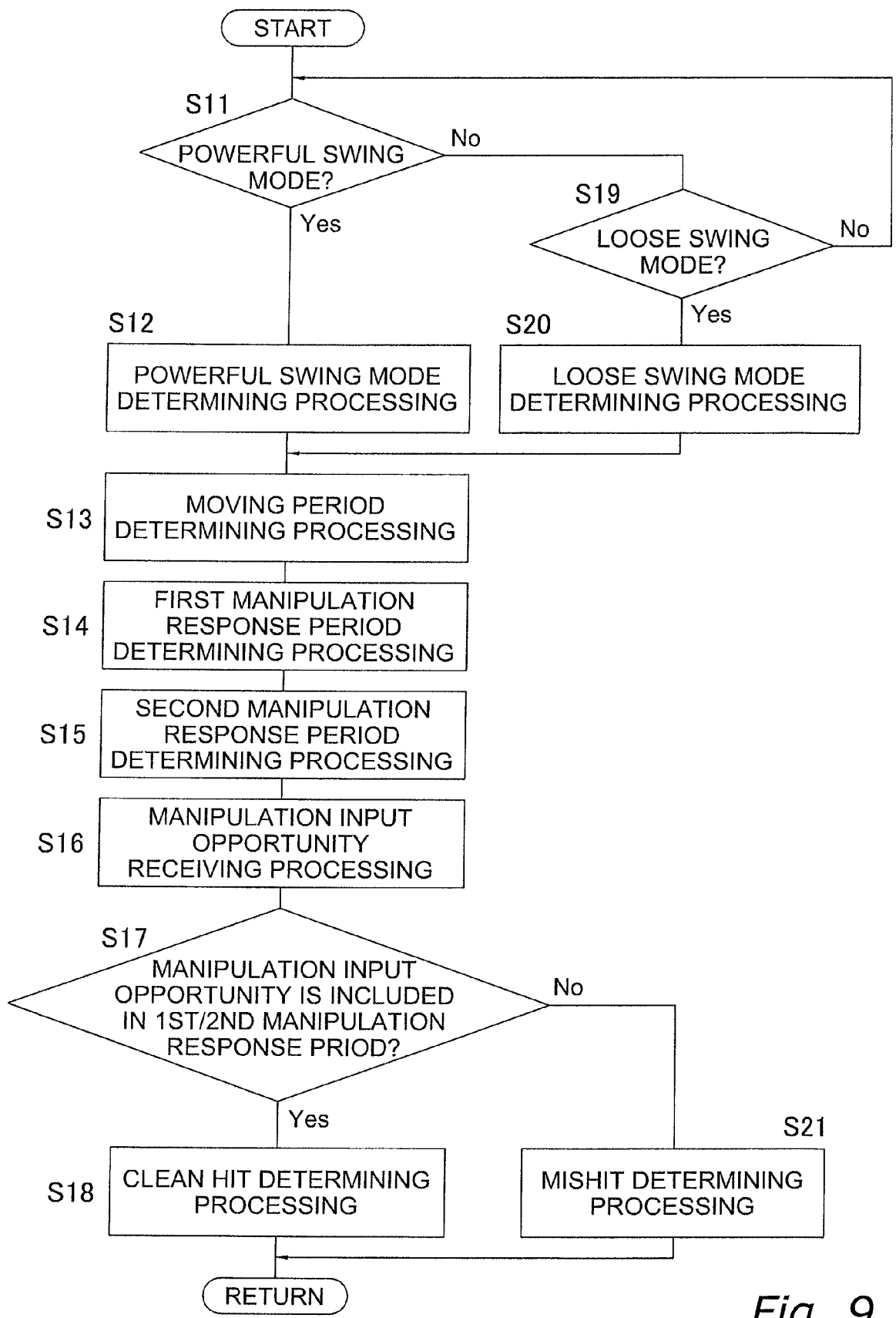
FIG. 9 is a flowchart for explaining a hitting result judgment processing.

As illustrated in FIG. 9, it is firstly judged in the batting result judgment processing in Step S6 whether the powerful swing mode is currently selected (S11). If the powerful swing mode is judged to be currently selected in Step S11, the present processing is moved to a powerful swing mode determination processing (S12), and the present mode is confirmed to be the powerful swing mode. If the powerful swing mode is judged not to be currently selected in Step S11, it is judged whether the loose swing mode is currently selected (S19). If the loose swing mode is judged to be currently selected in Step S19, the present processing is moved to a loose swing mode determination processing (S20), and the present mode is confirmed to be the loose swing mode. If the loose swing mode is judged not to be selected in Step S19, the present processing returns to Step S11. If the powerful swing mode determination processing in Step S12 and the loose swing mode determination processing in Step S19 are performed, the present processing is moved to a moving period determination processing (S13).

The moving period determination processing in Step S13 determines the moving period T0 illustrated in FIG. 7 in which the ball object 73 moves from the first position A illustrated in FIG. 7 to the second position B illustrated in FIG. 7 before the ball object 73 illustrated in FIGS. 3-6 starts moving. Here, as illustrated in FIG. 7, the moving period T0 is determined, which is the time elapsed while the ball object 73 moves from the pitching position (the first position A, that is, the surface from which the ball object 73 is released) of the pitcher character 71 to the batting position (the second position B, that is, the hitting surface that the ball object 73 reaches) of the batter character 72. Here, the moving period T0 is the time elapsed from the pitching start opportunity St0 illustrated in FIG. 7 when the ball object 73 is released to the pitching end opportunity E0 illustrated in FIG. 7 when the ball object 73 reaches the hitting surface. In the moving period determination processing in Step S13, a variety of data such as the moving period T0 in which the ball object 73 moves from the first position A to the second position B, the pitching start opportunity St0 at which the ball object 73 is released, and the pitching end opportunity E0 at which the ball object 73 reaches the hitting surface, are stored in the RAM 12. When the moving period determination processing in Step S13 is performed, the present processing is moved to a first manipulation response period determination processing (S14).

In the first manipulation response period determination processing in Step S14, when the powerful swing mode is currently selected, the predetermined first manipulation response period T1 of the bat object 74 illustrated in FIGS. 3-6 is determined, which begins at the first manipulation response start opportunity St1 preceding the pitching end opportunity E0 of the moving period T0 of the ball object 73 that is determined by the moving period determination processing in Step S12. Here, the predetermined first manipulation response period T1 of the bat object 74 is the manipulation response time with respect to an operation of pressing the third button 17c of the controller 17 for allowing the ball object 73 to be hit back on the powerful swing mode, and is the time elapsed from the first manipulation response staring opportunity St1 illustrated in FIG. 7 to the first manipulation response end opportunity E1 illustrated in FIG. 7. In the first manipulation response period determination processing in Step S14, a variety of data such as the predetermined first manipulation response period T1 of the bat object 74, the first manipulation start opportunity St1, and the first manipulation response end opportunity E1, are stored in the RAM 12. When the first manipulation response period determination processing in Step S14 is performed, the present processing is moved to a second manipulation response period determination processing (S15).

In the second manipulation response period determination processing in Step S15, when the loose swing mode is currently selected, the predetermined second manipulation response period T2 of the bat object 74 is determined, which begins at the second manipulation response start opportunity St2 succeeding the first manipulation response start opportunity St1 of the predetermined first manipulation response period T1 of the bat object 74 that is determined by the first manipulation response period determination processing in Step S14. Here, the predetermined second manipulation response period T2 of the bat object 74 is the manipulation response time with respect to an operation of pressing the third button 17c of the controller 17 for allowing the ball object 73 to be hit back on the loose swing mode, and is the time elapsed from the second manipulation response start opportunity St2 illustrated in FIG. 7 to the second manipulation response end opportunity E2 illustrated in FIG. 7. In the second manipulation response period determination processing in Step S15, a variety of data such as the predetermined second manipulation response period T2 of the bat object 74, the second manipulation response start opportunity St2, and the second manipulation response end opportunity E2, are stored in the RAM 12. When the second manipulation response period determination processing in Step S15 is performed, the present processing is moved to a manipulation input opportunity receiving processing (S16).

In the manipulation input opportunity receiving processing in Step S16, the manipulation input opportunity HP, at which the third button 17c of the controller 17 is pressed, is stored n the RAM 12. When the manipulation input opportunity receiving processing in Step S16 is performed, it is judged whether the manipulation input opportunity HP when the third button 17c of the controller 17 is pressed is included in either the predetermined first manipulation response period T1 of the bat object 74 on the powerful swing mode or the predetermined second manipulation response period T2 of the bat object 74 on the loose swing mode (S17). When the manipulation input opportunity HP, at which the third button 17c of the controller 17 is pressed, is judged to be included in either the predetermined first manipulation response period T1 of the bat object 74 on the powerful swing mode or the predetermined second manipulation response period T2 of the bat object 74 on the loose swing mode, it is judged that the ball object 73 is allowed to be hit back, in other words, the ball object 73 is cleanly hit (S18). When the manipulation input opportunity HP, at which the third button 17c of the controller 17 is pressed, is judged not to be included in either the predetermined first manipulation response period T1 of the bat object 74 on the powerful swing mode or the predetermined second manipulation response period T2 of the bat object 74 on the loose swing mode, it is judged that the ball object 73 is not allowed to be hit back, in other words, the ball object 73 is mishit (S21). When a clean hit determination processing of Step S18 and a mishit determination processing of Step S21 are performed, a variety of data such as the determined batting result are stored in the RAM 12, and a batting result action display processing is performed (S7).

The batting result action display processing in Step S7 reads out the variety of data, such as the batting result determined by the batting result judgment processing in Step S6, from the RAM 12, and displays actions performed by the batter character 72, the ball object 73, and the bat object 74 depending on the determined batting result. Here, swinging motion of the batter character 72 and the bat object 74, and motion of the ball object 73 that is cleanly hit or mishit by the bat object 74, are displayed. In Step S7, when commands for causing the batter character 72, the ball object 73, and the bat object 74 to perform an action are issued by the control unit 1 based on the game program, actions of the batter character 72, the ball object 73, and the bat object 74 are configured to be displayed on the television monitor 20 by continuously moving image data (e.g., polygon data) corresponding to the batter character 72, the ball object 73, and the bat object 74. Furthermore, in Step S7, the high score, the present score, and the remaining number of battings are displayed in the batting score result display area 41 depending on the batting result, and the gauge for displaying the timing of batting swing and the flying distance are displayed in the batting swing result display area 42 depending on the batting result.

Here, the first manipulation response start opportunity St1 of the predetermined first manipulation response period T1 of the bat object 74 on the powerful swing mode is set to precede the second manipulation response start opportunity St2 of the predetermined second manipulation response period T2 of the bat object 74 on the loose swing mode. Therefore, it is possible to set the timing of pressing the third button 17c of the controller 17 on the powerful swing mode to be faster than the timing of pressing the third button 17c of the controller 17 on the loose swing mode by the batting result judgment processing in Step S6. Because of this, in this game program, it is possible to realize a situation that the timing of hitting a ball with a bat when the bat is powerfully swung is perceived to be faster than the timing of hitting a ball with a bat when the bat is loosely swung. Accordingly, it is possible to realize a baseball game with reality that is more like the real-world baseball.

Other Embodiments (a) In the above described embodiment, a case is described that the home vide game device is used as an example of a computer to which the game program is allowed to be applied. However, the game device is not limited to the above described embodiment, and may be applied to a game device to which a monitor is separately provided, a monitor-integrated game device, a personal computer that functions as a game device when a game program is executed therein, a workstation, and the like, as well.

(b) The present invention includes a program for executing the above described type of game, a program method for executing the above described type of game, and a computer-readable recording medium in which the program is recorded. For example, a computer-readable flexible disk, a semiconductor memory, a CD-ROM, a DVD, a MO, a ROM cassette, and the like may be suggested as the recording medium other than the cartridge.

(c) In the above described embodiment, the predetermined first manipulation response period T1 of the bat object 74 is configured to end before the pitching end opportunity E0 of the moving period T0 of the ball object 73. In addition, the predetermined second manipulation response period T2 of the bat object 74 is configured to end after the pitching end opportunity E0 of the moving period T0 of the ball object 73. However, the predetermined first manipulation response period T1 of the bat object 74 and the predetermined second manipulation response period T2 of the bat object 74 are not limited to these.

INDUSTRIAL APPLICABILITY

According to the present invention, in the game program, the predetermined first operation response period of the object, which begins at the start opportunity preceding the end opportunity of the moving period of the moving object that is determined by the moving period determining function, is determined by the first manipulation response period determining function, when the predetermined first game condition is judged to be satisfied by the game condition judging function. In addition, the predetermined second operation response period of the object, which begins at the start opportunity after the start opportunity of the predetermined first manipulation response period of the object that is determined by the first manipulation response period determining function, is determined by the second manipulation response period determining function, when the predetermined second game condition is judged to be satisfied by the game condition judging function. Accordingly, it is possible to realize a baseball game with reality that is more like the real-world baseball.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A non-transitory computer readable medium storing a computer program of a game in which a first object moves from a first position to a second position and a second object moves to contact in a prescribed area with the first object by a user through an input operation with an operating unit, the computer program comprising:

code for judging whether a predetermined first game condition of the second object is satisfied or a predetermined second game condition of the second object is satisfied;

code for determining a moving period before the first object starts moving, the moving period being between when the first object starts moving from the first position and when the first object ends moving at the second position;

code for selecting a predetermined first operation response period of the second object when the predetermined first game condition is satisfied, the predetermined first operation response period in which the second object temporally has a chance to contact in the prescribed area with the first object;

code for selecting a predetermined second operation response period of the second object when the predetermined second game condition is satisfied, the predetermined second operation response period in which the second object temporally has a chance to contact in the prescribed area with the first object;

code for receiving an operation input from the operating unit operated by the user, after the first object starts moving;

code for judging whether or not the operation input is received either in the predetermined first operation response period or the predetermined second operation response period;

code for recognizing that the second object has the chance to contact in the prescribed area with the first object when the operation input is received in either the predetermined first operation response period or the predetermined second operation response period; and code for recognizing that the second object does not have the chance to contact in the prescribed area with the first object when the operation input is not received in either the predetermined first operation response period or the predetermined second operation response period, the prescribed area having a first prescribed size or a second prescribed size being larger than the first prescribed size, the first condition being satisfied when the prescribed area has the first prescribed size, the second condition being satisfied when the prescribed area has the second prescribed size, the first prescribed size or the second prescribed size being selected by the user, the predetermined first operation response period ending before the first object ends moving, the predetermined second operation response period ending after the first object ends moving.

2. A method for controlling a computer game in which a first object moves from a first position to a second position and a second object moves to contact in a prescribed area with the first object by a user through an input operation with an operating unit, the method comprising:

judging whether a predetermined first game condition of the second object is satisfied or a predetermined second game condition of the second object is satisfied;

determining a moving period before the first object starts moving, the moving period being between when the first object starts moving from the first position and when the first object ends moving at the second position;

selecting a predetermined first manipulation response period of the second object when the predetermined first game condition is satisfied, the predetermined first manipulation response period in which the second object temporally has a chance to contact in the prescribed area with the first object;

selecting a predetermined second manipulation response period of the second object when the predetermined second game condition is satisfied, the predetermined second manipulation response period in which the second object temporally has a chance to contact in the prescribed area with the first object;

receiving a manipulation input from the operating unit operated by the user, after the first object starts moving;

judging whether or not the manipulation input is received either in the predetermined first manipulation response period or the predetermined second manipulation response period;

recognizing that the second object has the chance to contact in the prescribed area with the first object when the operation input is received in either the predetermined first operation response period or the predetermined second operation response period; and recognizing that the second object does not have the chance to contact in the prescribed area with the first object when the operation input is not received in either the predetermined first operation response period or the second operation response period, the prescribed area having a first prescribed size or a second prescribed size being larger than the first prescribed size, the first condition being satisfied when the prescribed area has the first prescribed size, the second condition being satisfied when the prescribed area has the second prescribed size, the first prescribed size or the second prescribed size being selected by the user, the predetermined first operation response period ending before the first object ends moving, the predetermined second operation response period ending after the first object ends moving.

* * * * *